(12) United States Patent
Xie et al.

(10) Patent No.: US 8,718,360 B2
(45) Date of Patent: May 6, 2014

(54) COLOUR IMAGE ENHANCEMENT

(75) Inventors: Yingrong Xie, Eindhoven (NL); Michiel Adriaanszoon Klompenhouwer, Breda (NL)

(73) Assignee: NXP B.V., Eindhoven (NL)

( * ) Notice: Subject to any disclaimer, the term of this patent is extended or adjusted under 35 U.S.C. 154(b) by 365 days.

(21) Appl. No.: 12/916,460

(22) Filed: Oct. 29, 2010

(65) Prior Publication Data

US 2011/0110588 A1    May 12, 2011

(30) Foreign Application Priority Data

Nov. 6, 2009   (EP) ..................................... 09175315

(51) Int. Cl.
     *G06K 9/00*      (2006.01)
     *G09G 5/02*      (2006.01)

(52) U.S. Cl.
     USPC .......................................... 382/162; 345/590

(58) Field of Classification Search
     None
     See application file for complete search history.

(56) References Cited

U.S. PATENT DOCUMENTS

| | | | | |
|---|---|---|---|---|
| 5,539,540 | A * | 7/1996 | Spaulding et al. | 358/518 |
| 7,155,053 | B2 * | 12/2006 | Nakajima et al. | 382/162 |
| 2003/0142879 | A1 * | 7/2003 | Kim | 382/274 |
| 2006/0181741 | A1 * | 8/2006 | Hsu et al. | 358/3.27 |

OTHER PUBLICATIONS

Weeks et al., "Histogram Equalization of 24-bit Color Images in the Color Difference (C-Y) Color Space", Jan. 22, 1995, Journal of Electronic Imaging 4(1), 8 pages.*
Bockstein, Ilia M. "Color Equalization Method and its Application to Color Image Processing," J. Opt. Soc. Am. A, vol. 3, No. 5, May 1986, 3 pages.*
Strickland, et al. "Digital Color Image Enhancement Based on the Saturation Component," Optical Engineering, vol. 26, No. 7, pp. 609-616 (Jul. 1987).
Mlsna, et al. "3D Histogram Modification of Color Images,", Proc. IEEE Int'l. Conf. on Image Processing, pp. 1015-1018 (1996).
Pichon, et al. "Color Histogram Equalization Through Mesh Deformation," Int'l. Conf. on Image Processing, 4 pgs. (Sep. 2003).
Kim, et al. "Wide Gamut Multi-Primary Display for HDTV," 2nd European Conf. on Colour Graphics, Imaging and Vision, pp. 248-253 (2004).
Sun, et al. "Dynamic Contrast Enhancement Based on Histogram Specification," IEEE Trans. on Consumer Electronics, vol. 51, No. 4, pp. 1300-1305 (Nov. 2005).
Grundland, et al. "Color Histogram Specification by Histogram Warping," Proc. of SPIE, vol. 5667, 12 pgs. (2005).
Muijs, et al. "Subjective Evaluation of Gamut Extension Methods for Wide-Gamut Displays," Proc. 13$^{th}$ Annual Int'l. Display Workshops, 5 pgs. (Dec. 2006).
Bassiou, et al. "Color Image Histogram Equalization by Absolute Discounting Back-Off", Computer Vision and Image Understanding 107, pp. 108-122 (2007).

* cited by examiner

*Primary Examiner* — Jason M Repko
*Assistant Examiner* — Ryan P Potts

(57) ABSTRACT

A color image enhancement method, for enhancing the color of a color image comprising a plurality of pixels. The method comprises: mapping a color saturation value of each pixel to a normalized saturation value, wherein the range of values of normalized saturation is the same independent of the luminance value of the pixel; estimating a probability distribution of the normalized saturation values; defining a transfer function for modifying the normalized saturation values, based on the estimated probability distribution; and applying the transfer function to the normalized saturation values to generate modified values.

13 Claims, 6 Drawing Sheets

COLOUR IMAGE ENHANCEMENT

This application claims the priority under 35 U.S.C. §119 of European patent application no. 09175315.2, filed on Nov. 6, 2009, the contents of which are incorporated by reference herein.

FIELD OF THE INVENTION

This invention relates to colour enhancement of colour images. It is particularly relevant to colour enhancement for wide gamut displays.

Here, an image may refer to a still image or a frame of a video sequence. In both cases, colour enhancement can be an important aspect of picture quality improvement.

It is known to use histogram manipulation for grey-scale image enhancement. In particular, techniques such as histogram equalisation have been effectively and widely used for grey-scale contrast enhancement. In Weeks et al. (Arthur R. Weeks, G. Eric Hague, and Harley R. Myler, "Histogram equalization of 24-bit color images in the color difference color space", Journal of Electronic Imaging 4(1), 15-22, January 1995), it has been proposed to extend the idea of luminance histogram equalisation and apply it to colour processing. According to that method, histogram equalisation is applied to the saturation component in the colour difference (C-Y) colour space. This is followed by an independent equalisation of the luminance component.

SUMMARY OF THE INVENTION

According to an aspect of the present invention, there is provided a colour image enhancement method, for enhancing the colour of a colour image comprising a plurality of pixels, the method comprising: mapping a colour saturation value of each pixel to a normalised saturation value, wherein the range of values of normalised saturation is the same independent of the luminance value of the pixel; estimating a probability distribution of the normalised saturation values; defining a transfer function for modifying the normalised saturation values, based on the estimated probability distribution; and applying the transfer function to the normalised saturation values to generate modified values.

The method normalises the values of colour saturation, so that the range of values is the same irrespective of the luminance (brightness) of the input pixel. In this way, the normalised saturation values of pixels of different luminance become comparable. This is beneficial for colour enhancement, because the colour properties of pixels of different luminance can be analysed and modified together. The analysis comprises estimating the probability distribution of pixels in the normalised saturation space and modifying the saturation values to adjust the colour contrast. This means that the enhancement adapts to the statistical content of the input image. The probability estimate may comprise a histogram. The modification is performed using a transfer function within the normalised space. This transfer function will typically be a monotonic non-decreasing function, mapping normalised saturation values to modified normalised saturation values. After modification in the normalised space, the normalisation may be inverted, to return output pixel saturation values. However, it is also possible to apply the enhancement in the original colour space using other approaches.

Whereas the method of Weeks et al. required separate histograms to be calculated for each of a set of different luminance regions, the present invention enables all luminance levels to be considered simultaneously. Thus, it is no longer necessary to compute individual histograms for separate slices of luminance. Similarly, it becomes possible to define a single, consistent modification for pixels of all luminance values, rather than having to enhance individual luminance slices separately. This can allow the present method to be both simpler and more effective.

The mapping from colour saturation values to normalised saturation values may be such that the range of values of normalised saturation is the same independent of the hue value of each pixel.

The normalisation may take into account the hue of the input pixel in addition to its luminance. This acknowledges that the range of values of saturation varies not only with luminance but also with hue. This allows greater flexibility in the method and ensures that saturation values of all hues can be enhanced to the greatest extent possible.

The mapping from colour saturation to normalised saturation preferably comprises representing the colour saturation value of each pixel relative to a maximum saturation value dependent on the luminance and/or hue of that pixel.

For example, the normalisation can be achieved by mapping the input saturation values to a saturation ratio.

The step of estimating the probability distribution of the normalised saturation values may comprise estimating the distribution of normalised saturation values for each of a plurality of hue intervals.

This allows the method to adapt independently to the saturation characteristics of different hues and to enhance the colour accordingly. Different transfer functions can then be defined for each of the intervals. For example, the pixels in the input image having a red hue might benefit from enhancement of one type and degree; while the pixels of blue hues might be distributed differently, so that they would benefit from a different type of enhancement and to a greater or lesser degree than the red pixels.

The colour enhancement transfer function can be defined so as to modify the distribution of the normalised saturation values to better match a target distribution.

If the distribution is modelled using a histogram, then this method can advantageously be implemented as a generalised histogram modification algorithm operating on the saturation histogram (or histograms).

The target distribution may be one of: a uniform distribution; and a distribution derived from or dependent on the estimated distribution—for example a smoothed version of the estimated distribution.

If the probability distribution estimate is a histogram, then targeting a uniform distribution would correspond to histogram equalisation. On the other hand, targeting a smoothed distribution is one advantageous form of histogram modification (also known as histogram specification).

The maximum slope of the transfer function may be limited by a threshold.

It may be advantageous to limit the gain of the transfer function. This helps to avoid sharp transitions in saturation, which could lead to visible artefacts in the enhanced output image.

Optionally, the threshold varies dependent on the normalised saturation value.

Although a single, fixed threshold can be applied, it may be preferable to use a threshold function that is itself dependent on the (normalised) saturation value. In this way, the sharpness of the saturation transitions caused by transfer function can be controlled according to the level of saturation. In particular, it may be beneficial to apply a lower threshold at lower levels of saturation. This can help to avoid over enhancement of pixels which had relatively low levels of saturation to begin with.

The method may further comprise, before the step of applying the transfer function to the normalised saturation values, smoothing the transfer function.

For example, an averaging filter, such as a Gaussian kernel approximation can be applied. In the case that probability distributions have been estimated for the (normalised) saturation in each of a plurality of hue intervals, this smoothing preferably includes smoothing across corresponding bins of the same normalised saturation and different hues. That is, if the distribution is considered as a joint, two-dimensional distribution of normalised saturation and hue, the smoothing is performed at least in the hue dimension.

The method can further comprise applying a second, fixed transfer function to the normalised saturation values, or to the colour saturation values.

This can be used to combine the adaptive colour enhancement with another, fixed colour transformation. The fixed transfer function may comprise, for example, a mapping between different colour gamuts or colour spaces, or may represent a fixed colour-contrast enhancement function.

Also provided is, a colour-gamut extension method comprising the colour image enhancement method.

The colour image enhancement methods described are particularly suitable for converting image signals that have been defined according to a standard colour gamut (such as ITU-R Recommendation BT.709 or BT.601) for use with wide gamut displays. Such displays are able to display colours outside the standard defined gamuts, in order to give a richer picture. Unless bespoke, wide-gamut content is provided which matches the display capabilities, it is necessary to enhance the colour of input images in order to exploit the full potential of these displays. Otherwise, the image would only be displayed with the standard gamut—which is a subset of the wider gamut of the display. In the past, this gamut conversion process has usually used fixed mapping or warping between the standard and wide gamut, which expands the colour content of all images identically. However, the present methods can be used to adaptively expand the range of colours of an input image, based on its individual colour content. This can enable the capabilities of the wide gamut display to be better exploited and allow the colour of the input image to be enhanced to a greater extent than was possible with fixed mappings.

The invention also provides a computer program comprising computer program code means adapted to perform all the steps of the method when said program is run on a computer; and such a computer program embodied on a computer readable medium.

Also provided is colour image processing apparatus, for enhancing the colour of a colour image comprising a plurality of pixels, the apparatus comprising: a first colour space conversion unit, adapted to map a colour saturation value of each pixel to a normalised saturation value, wherein the range of values of normalised saturation is the same independent of the luminance value of a pixel; a saturation modification unit, adapted to estimate a probability distribution of the normalised saturation values; define a transfer function for modifying the normalised saturation values, based on the estimated probability distribution; and apply the transfer function to the normalised saturation values; and a second colour space conversion unit, adapted to inversely map the normalised saturation value of each pixel to generate an output colour saturation value.

BRIEF DESCRIPTION OF THE DRAWINGS

The invention will now be described by way of example with reference to the accompanying drawings, in which.

DETAILED DESCRIPTION OF EMBODIMENTS

Figure 1:
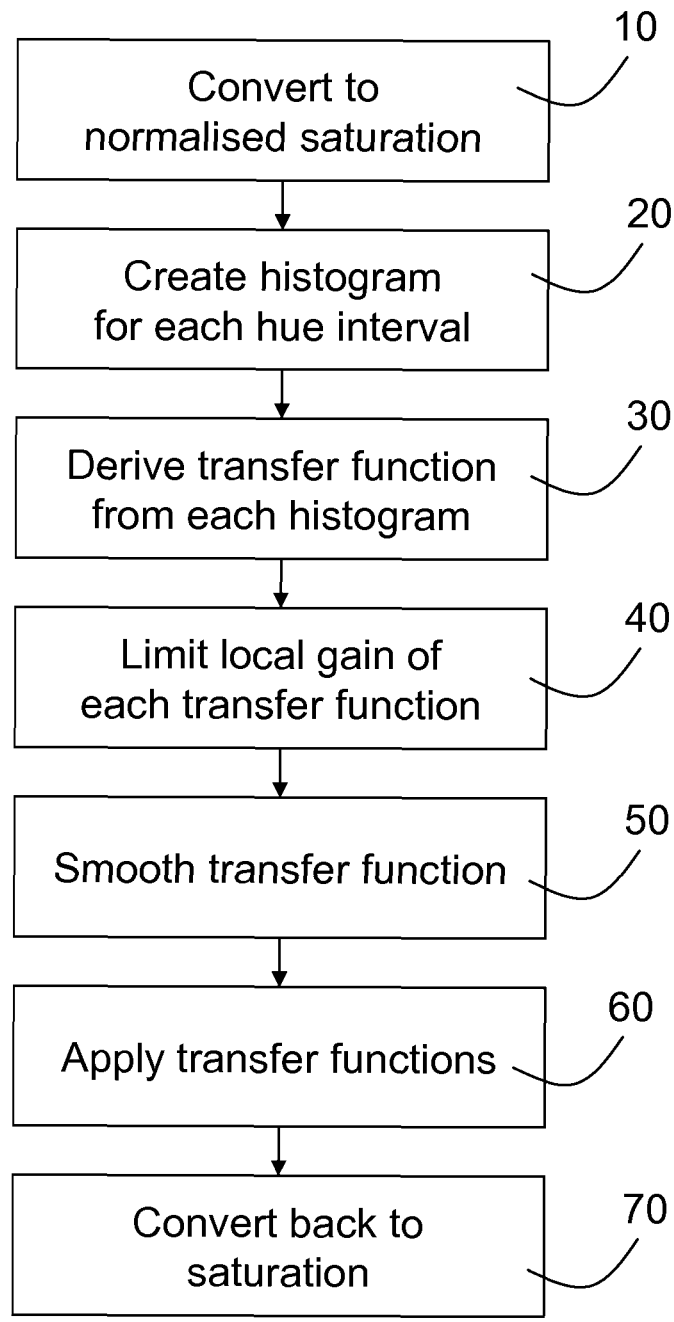
FIG. 1 is a flowchart of a colour image enhancement method according to an embodiment.

FIG. 1 illustrates the sequence of steps in a method according to an embodiment of the invention. In step 10, the saturation value of each input colour pixel is converted to a normalised saturation value. This conversion comprises mapping the colour saturation value to a normalised saturation value, such that the range of the normalised saturation values is the same independent of the luminance value of the pixel.

As will be well known to those skilled in the art, the range of values that can be taken by the saturation component of a colour pixel is dependent on the brightness (luminance) of that pixel. In particular, colours very close to the extremes of luminance (black and white, respectively) cannot have large saturation values. This can be understood by considering the relationship between the Red, Green and Blue (R, G, B) primaries that are used to display a colour image and the saturation component of colour. Treating R, G, and B as orthogonal axes leads to a representation of the space of possible colours as a cube. Luminance is usually defined along a diagonal direction through the RGB colour cube—though not necessarily the main diagonal, (0, 0, 0) to (1, 1, 1). The chosen diagonal is the grey axis, along which colours are unsaturated. "Colourful" pixels deviate from this axis: the amount of deviation corresponds to saturation; and the angle about the grey axis defines the hue. Different definitions of luminance, saturation and hue have been used. Here, by way of example, we will define saturation as:

$$S=\sqrt{C_b^2+C_r^2}$$

where Cb and Cr are the chroma signals defined according to the Rec.709 YCbCr standard.

Since the saturation is the radial distance from the grey axis to a given colour within the colour cube, pixels with intermediate values of luminance (Y) can have a large range of saturation values. However, for pixels close to the ends of the diagonal, in the black corner and the white corner of the colour cube, the variation transverse to the axis is more limited and so the saturation takes on a small range of values.

This presents a difficulty in analysing and enhancing saturation, because the values cannot be compared directly, due to their different ranges. Weeks et al. avoided this difficulty by constructing separate histograms of saturation for different intervals of the luminance axis. However, this is undesirable for several reasons. Firstly, more computational effort is consumed, because each histogram must be processed separately. Secondly, the number of pixels falling into each slice (interval) along the luminance dimension is much reduced compared with the total number of pixels in the image. This leads either to unreliable estimation of the distribution or, conversely, to the need for wider intervals when constructing the saturation histograms. Thirdly, by processing the different slices of luminance separately, there is a risk of introducing visible artefacts, because different modifications are applied on either side of the arbitrary boundaries between intervals. In addition, with the method of Weeks et al., although saturation is enhanced carefully for each slice, using a suitable dynamic range, there is a subsequent and independent luminance equalisation step. This takes no account of the saturation values, and pixel values can be shifted out of the colour cube, to RGB values that are not realisable. That is, their colours can be pushed out of the gamut.

The normalised saturation of the present invention addresses these problems, because it makes it possible to consistently compare the saturation levels of pixels having different luminance.

Preferably, the mapping from saturation values to normalised saturation values is such that the range of values of normalised saturation is also independent of the hue value of each pixel.

In the present embodiment, this is achieved by representing the colour saturation value of each pixel relative to a maximum saturation value, $S_{max}$, dependent on the luminance, Y, and hue, H, of that pixel:

$$S_n = \frac{S}{S_{max}(H, Y)}.$$

$S_{max}$ is the maximum possible saturation for each particular combination of hue and luminance and is therefore defined by the boundaries of the gamut. However, alternative definitions could be used in other embodiments—for example, based on the range of saturations observed or likely to be observed in a given image, or ensemble of images.

Figure 2:
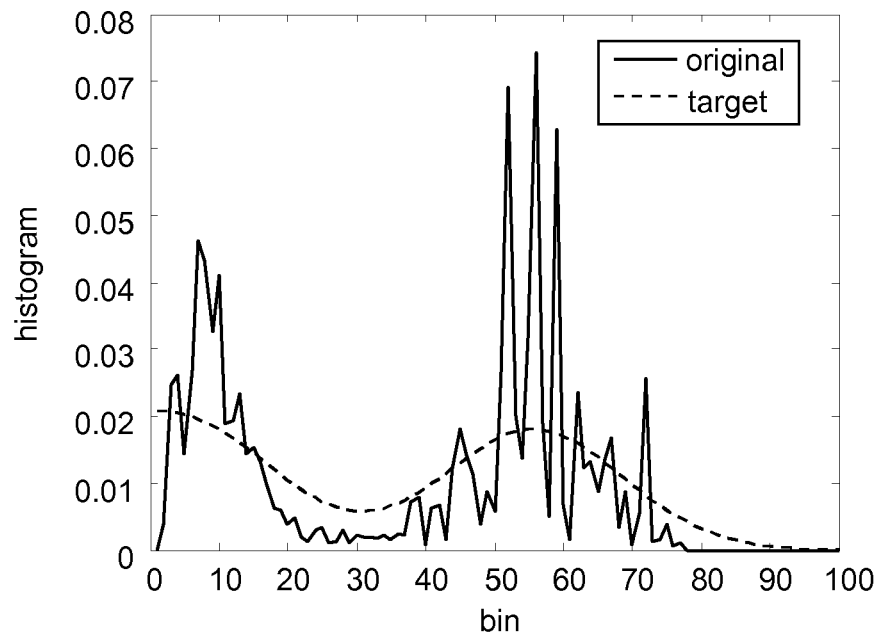
FIG. 2 is an example of a histogram showing the distribution of normalised saturation values.

The method continues by estimating 20 a probability distribution of the normalised saturation values. In the present embodiment, this comprises estimating the distribution of normalised saturation values for each of a plurality of hue intervals. A histogram can be used for the probability distribution estimate. In particular, in the present embodiment, a two-dimensional (2D) histogram is calculated, which consists of a one-dimensional (1D) histogram of normalised saturation values for each hue interval. An example of such a 1D histogram is shown in FIG. 2. In this graph, the bins on the x-axis are intervals of normalised saturation. The y-axis is the histogram value: the proportion of pixels falling into each bin.

To enhance the colour, a transfer function for modifying the normalised saturation values is defined 30, based on the estimated probability distribution. In this embodiment, a process of histogram modification is applied to each of the 1β normalised saturation histograms. Histogram modification (also known as histogram specification) is a generalisation of the well-known technique of histogram equalisation. Details can be found, for example, in Sun et al. (Chi-Chia Sun, Shanq-Jang Ruan, Mon-Chau Shie, and Tun-Wen Pai, "Dynamic contrast enhancement based on histogram specification", IEEE transactions on consumer electronics, 51(4), 1300-1305, November 2005). Briefly, histogram equalisation uses the cumulative distribution function of the input distribution to define a transfer function. Applying this transfer function to the pixels values tends to flatten the distribution (equalising it, or making it more uniform). In histogram specification, the goal is to make the input distribution more like a target distribution. This target may have any desired shape. The method proceeds by calculating the cumulative distribution function of the target distribution. This represents the transfer function that would reshape the target distribution into a flat (equalised) distribution. The inverse of this transfer function will therefore reshape a flat distribution into the target. Thus, by applying the inverse of the target cumulative distribution function to the source cumulative distribution function, a combined transfer function can be defined which maps the source distribution to the target distribution.

In general, histogram specification works better when the target distribution is chosen in dependence on the source distribution. This reflects the fact that there is no single, generic target distribution that is suitable for enhancing images of all kinds. In the present embodiment, the target distribution is a smoothed version of the estimated distribution. It is obtained by applying a Gaussian filter to the original histogram. The kernel size of the Gaussian determines the degree of smoothing and thus the amount of enhancement. In the present embodiment, with 100 histogram bins, the kernel size can be chosen from within a typical range of 20 to 30 bins. This parameter might advantageously be varied dependent on hue—for example, it might be assigned a small value for hue intervals corresponding to skin tones, so as to minimise the modification applied to these colours. Note that as the kernel size tends toward infinity, the results tend toward those of histogram equalisation.

Figure 3:
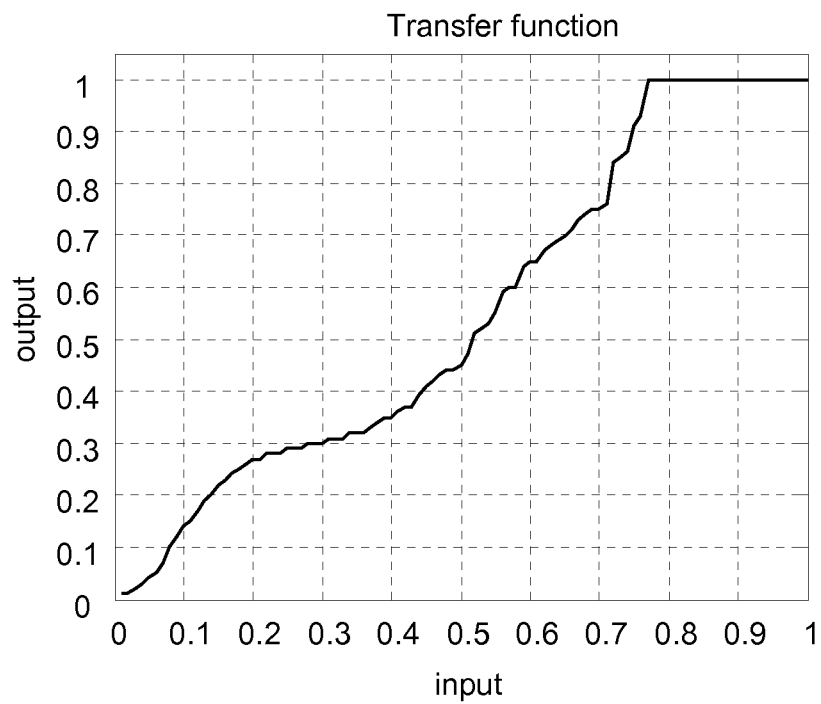
FIG. 3 shows a transfer function derived from the histogram of FIG. 2.

The target histogram is shown by a dashed line in the example of FIG. 2. The corresponding transfer function for modifying the normalised saturation values is shown in FIG. 3.

The transfer function will be applied 60 to the normalised saturation values to generate modified values. In the present embodiment, since separate transfer functions are calculated for each hue, a 2D look-up table (LUT) is constructed. Each row of this table is the saturation transfer function for a given hue interval. The input indices to the LUT are therefore the original normalised saturation and the hue. The output value is the modified (enhanced) normalised saturation.

The method concludes by inversely mapping 70 the modified value of normalised saturation for each pixel to generate an output colour saturation value. In the present embodiment this inverse mapping 70 comprises simply multiplying the modified normalised saturation value by the relevant value of $S_{max}(H, Y)$, to return it to its original scale again.

The transfer function defined above may result in sharp transitions in saturation. These correspond to steep sections of the transfer function, where similar input values can result in widely separated output values. Such discrepancy can lead to visible artefacts in the output image. For this reason, in many applications it is preferable to limit the maximum slope of the transfer function to a predetermined threshold, before applying it. This mediation of sharp transitions can also be thought of as a smoothing operation. Indeed, other smoothing operations may have a similar beneficial effect.

Figure 4:
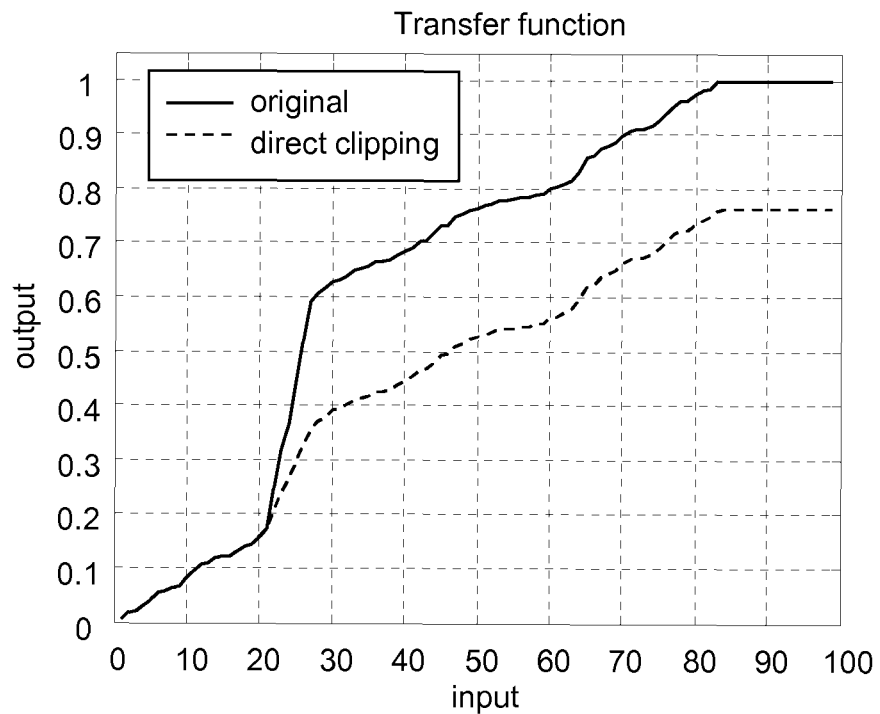
FIG. 4 shows a transfer function before and after the local gain has been limited.
Figure 5:
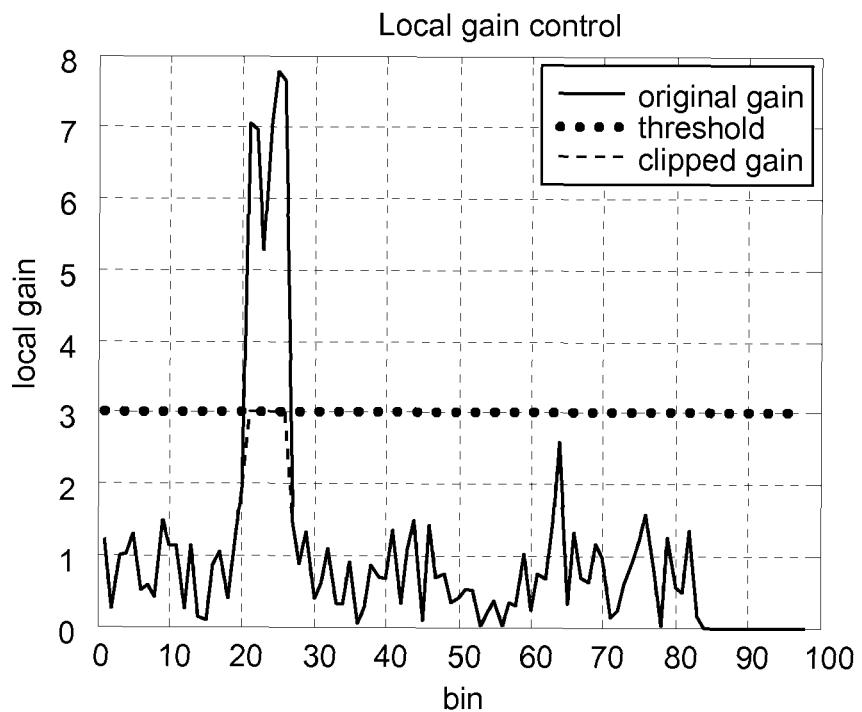
FIG. 5 shows how local gain can be limited by clipping.

In this embodiment, a threshold is used to limit 40 the local gain—that is, the first derivative of each 1D transfer function. The derivative is calculated as the difference between two successive bins. The dashed curve in FIG. 4 shows an example of a transfer function where the local gain has been constrained to be no more than 3, so that any larger values are clipped to 3. FIG. 5 shows the corresponding gain curves.

Figure 6:
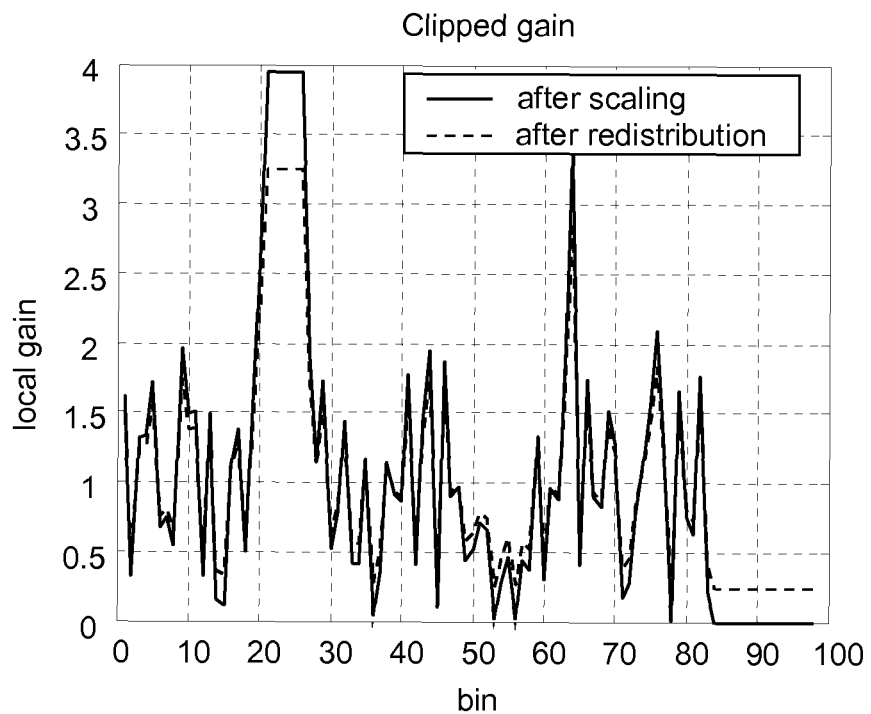
FIG. 6 compares the effects of scaling and redistribution on the clipped gain function of FIG. 5.

Although clipping the local gain is simple, the integral of the clipped values will be decreased correspondingly. Thus, when the new, gain-limited transfer function is calculated by cumulatively summing the gain, the transfer function will end at a lower output value. This can be seen by comparing the original (solid) curve of FIG. 4, with the gain-limited (dashed) result. To preserve the original maximum output, the transfer function should be adjusted further. One simple solution is to scale it to restore its final output value. However, this counteracts the effect of the threshold and increases the overall local gain again, as shown in FIG. 6. In this plot, the gain after re-scaling is shown by the solid curve. In the region where clipping occurred, the re-scaled gain once again significantly exceeds the gain_threshold of 3.

Instead, in the current embodiment, the value is redistributed above the threshold. The overall procedure can be described by the following expressions:

$$\text{gain\_clip}(i) = \begin{cases} \text{gain\_org}(i) & \text{if gain\_org}(i) \leq \text{gain\_thre}(i) \\ \text{gain\_thre}(i) & \text{if gain\_org}(i) > \text{gain\_thre}(i) \end{cases}$$

where gain_org(i) is the original local gain, gain_thre(i) is the threshold function, and gain_clip(i) is the local gain after clipping.

$$\text{gain\_new}(i) = \text{gain\_clip}(i) + \frac{\sum_{i=1}^{M-1} \text{gain\_org}(i) - \sum_{i=1}^{M-1} \text{gain\_clip}(i)}{M-1}$$

where gain_new(i) is the redistributed local gain. The index i represents the ith bin and is in the range of [1, M−1]. The redistribution has the effect of shifting the clipped gain by the difference between the original mean gain and the mean of the clipped gain. That is, the mean value of the clipped gain is restored to its original level.

Figure 7:
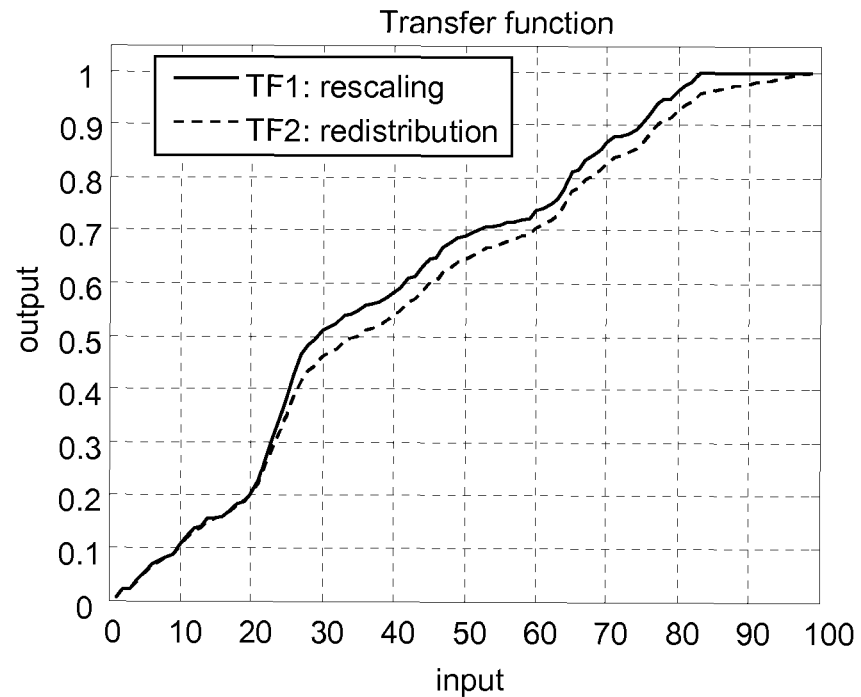
FIG. 7 shows the transfer functions corresponding to the scaled and redistributed gain functions of FIG. 6.

FIGS. 6 and 7 show a comparison of scaling and redistribution. FIG. 6 shows the gain and FIG. 7 shows the resulting transfer function for each case. The maximum local gain after re-scaling reaches almost 4, while for redistribution the result is about 3.2—much closer to the threshold of 3. In this example, therefore, redistribution is more effective than scaling.

Figure 8:
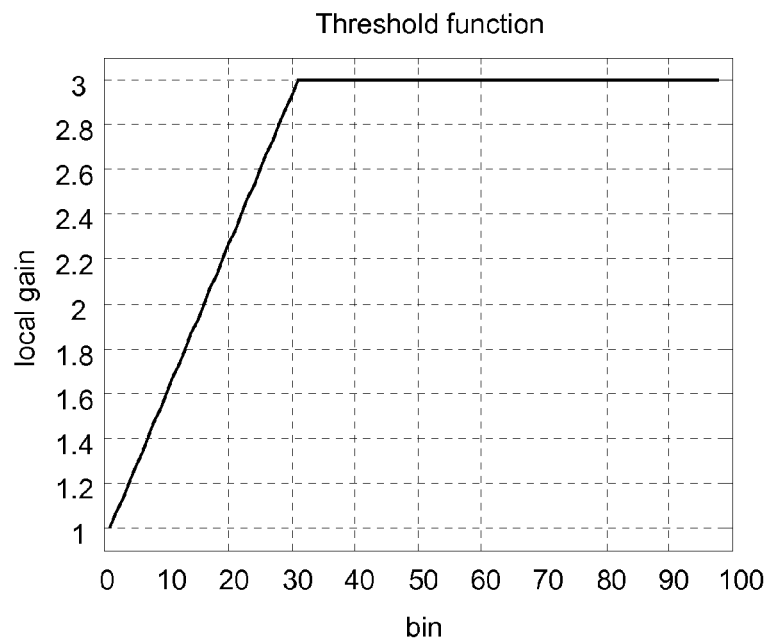
FIG. 8 shows an exemplary threshold function for limiting the local gain.

The gain_threshold gain_thre(i) is not necessarily a single constant value. It may be a more sophisticated function, whereby the threshold varies dependent on the normalised saturation value. The inventors have discovered that the piece-wise linear function of FIG. 8 is a good candidate. This has a gradual linear change at low values of normalised saturation, and so it is able to protect greyish and de-saturated colours from over enhancement.

It is also beneficial to smooth along the hue dimension. In this embodiment, a Gaussian filter is implemented to smooth 50 the 2β LUT along the hue axis. Of course, other filters can also be used.

After processing by these two smoothing procedures, a smoother 2D LUT is obtained and will be applied 60 to enhance input image.

Figure 9:
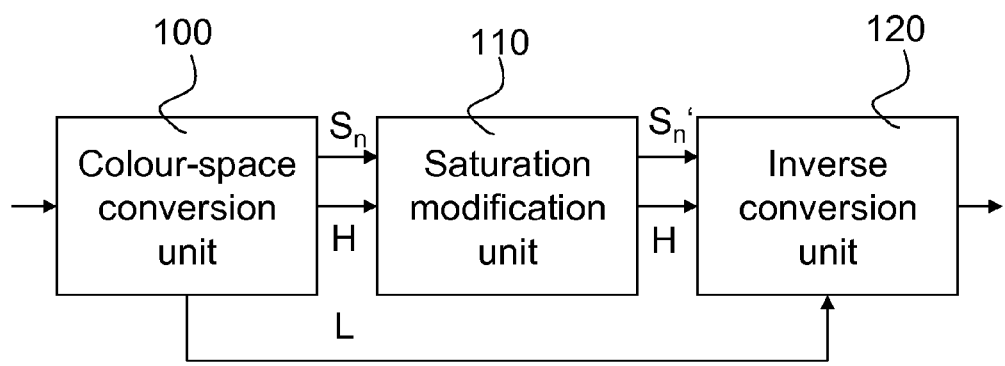
FIG. 9 is a block diagram of a hardware implementation according to an embodiment of the invention.

FIG. 9 shows a block diagram of colour image processing apparatus according to one embodiment of the invention. This comprises a first colour space conversion unit 100, adapted to map a colour saturation value of each pixel to a normalised saturation value, wherein the range of values of normalised saturation is the same independent of the luminance value of a pixel. That is, the colour space conversion unit 100 performs the step 10 of converting saturation values to normalised saturation, as described above. The input to the conversion unit 100 can be in any suitable form: for example, in the standard RGB or YCbCr colour spaces.

The colour space conversion unit 100 provides hue H and normalised saturation $S_n$ data to a saturation modification unit 110 and passes luminance data L to an inverse conversion unit 120.

The saturation modification unit 110 is adapted to estimate a probability distribution of the normalised saturation values. It is also adapted to define a transfer function for modifying the normalised saturation values, based on the estimated probability distribution; and to apply the transfer function to the normalised saturation values. Thus, in this embodiment, the saturation modification unit 110 implements the step 20 of creating a saturation histogram for each hue interval; the step 30 of deriving a transfer function for each of these histograms; the optional steps 40, 50 of limiting gain and smoothing the transfer function; and the step 60 of applying the transfer function to enhance the saturation.

The second (inverse) colour space conversion unit 120 receives modified normalised saturation data and hue data from the saturation modification unit 110 and receives luminance data from the first colour space conversion unit 100. The second colour space conversion unit 120 is adapted to inversely map the normalised saturation value of each pixel to generate an output colour saturation value. This inverse mapping step 70 has been described above. The output of the second colour space conversion unit 120 can be in whatever format is desired (for example, a format suitable for driving a display).

Figure 10:
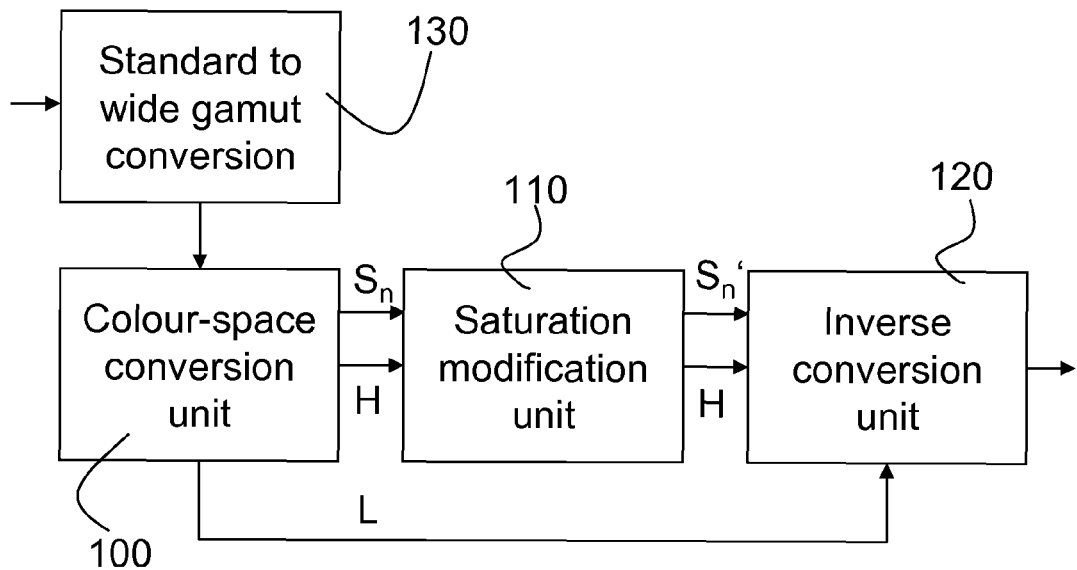
FIG. 10 shows a block diagram of an implementation according to another embodiment.

FIG. 10 shows a further embodiment, in which the colour enhancement algorithm is used for gamut extension. This embodiment is suitable for enhancing standard gamut signals for display on wide gamut displays. The processing pipeline is similar to that of FIG. 9, except that an extra colour space conversion block 130 is added at the beginning, to convert input signals in standard format to wide gamut signals. Then saturation histogram modification processing is run on wide gamut signals. Thus, the colour space conversion unit 100 receives inputs that are already defined in the wide gamut. The conversion from standard gamut to wide gamut in conversion block 130 can use a fixed mapping. Thus the overall method implemented comprises a combination of this fixed transfer function with the transfer function defined by the colour enhancement algorithm.

Alternatively, it is possible to use the same processing pipeline as FIG. 9 (without the initial conversion from standard to wide gamut in block 130). In this case, the transfer function will produce modified saturation values with a wider range—for example, normalized saturation taking values greater than 1. At the end of the pipeline, the inverse colour space conversion block 120 takes the wide gamut definition into account and outputs wide gamut signals directly.

In all the embodiments described above, the enhancement is executed in the normalised saturation space and the method concludes by inversely mapping the modified value of normalised saturation for each pixel to generate an output colour saturation value. However, this is not the only method by which the enhancement can be applied in the original (input) colour space. For example, in alternative embodiments, the transfer function can be derived 30, 40, 50 and applied 60 as described above. Then, the normalised saturation $S_n$ and its corresponding modified value $S_n'$ are compared at each pixel to define a gain map over the whole image. The gain map can be calculated using the formula:

$$g = \frac{S'_n}{S_n}$$

This gain map can be applied to the pixel saturation values in the original (standard or wide gamut) colour space. This formulation of the colour enhancement method may be advantageous where it is desired to combine the method with another colour enhancement algorithm—for example an algorithm using a fixed mapping. The gain derived for each pixel using the normalised saturation can be applied as an additional multiplicative factor when implementing the fixed gain map of the other algorithm.

Figure 11:
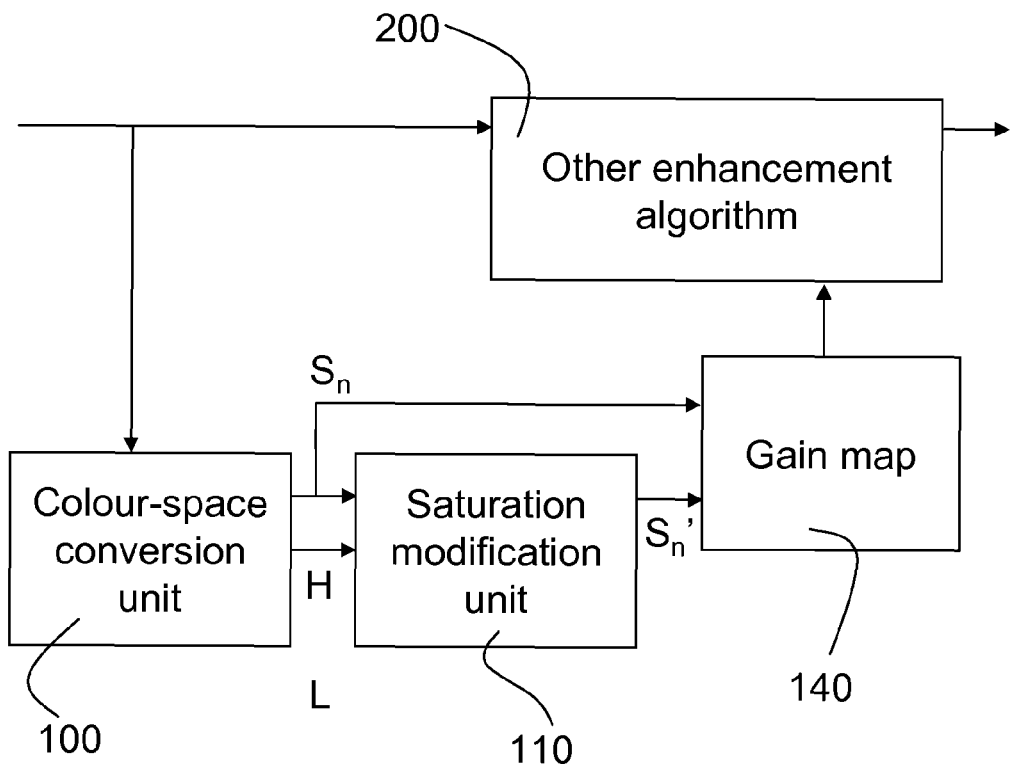
FIG. 11 shows a block diagram of yet another embodiment.

FIG. 11 shows a block diagram of such an embodiment, where a gain map according to the present invention is used to supplement another colour enhancement algorithm. The normalised saturation $S_n$, output from the colour-space conversion unit 100, and the modified saturation $S_n'$, output from the saturation modification unit 110, are provided to a separate enhancement algorithm 200 in the form of a gain map 140.

The present invention can be applied in video-processing pipelines for television systems having standard display gamuts. It can also be utilized to fully exploit the potential of wide gamut displays. When used in video processing application—for example in a TV or set-top box—the colour enhancement may be implemented in a hardware pipeline like those of FIGS. 9-11. The pipeline might be designed in a variety of ways. For example, it may comprise a single Application Specific Integrated Circuit (ASIC) or a reconfigurable logic device such a Field Programmable Gate Array (FPGA). The different parts of the pipeline may be implemented in the same or different physical components.

Other applications, such as mobile devices and computer-based applications, can also benefit from the invention. In this case it may be more economical to implement the method using general purpose hardware that is already available in the device, such as a Digital Signal Processor (DSP), graphics sub-system or general purpose central processing unit (CPU). Such general purpose hardware can be adapted to perform methods according to embodiments of the invention using conventional programming techniques. Those skilled in the art will be familiar with such programming methods.

The colour enhancement of the present invention automatically adapts to image content. It can achieve hue-dependent processing by normalising saturation values so as to take hue into account and by tuning the degree of transfer function smoothing per hue region. This makes the approach very flexible. It is also free of clipping problems, thanks to the definition of normalized saturation.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein luminance enhancement is also performed. It may be advantageous to perform such contrast enhancement in the normalised saturation domain—that is, before the inverse mapping from normalised saturation to regular colour saturation. If luminance enhancement is performed in this way, there is no risk of clipping, because the inverse mapping of normalised contrast will take into account the new luminance value.

Note that part or all of the methods and apparatus of the invention may be operated on analogue signals or on digital data values. Herein, references to values are taken to include either form of image signal.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A colour image enhancement method, for enhancing a colour of a colour image comprising a plurality of pixels, the method comprising:
   (a) mapping a colour saturation value of each pixel to a normalised saturation value, wherein a range of values of normalised saturation is the same independent of the luminance value of the each pixel, wherein the colour saturation value of the each pixel is represented relative to a maximum saturation value dependent on at least one of the luminance and the hue of the each pixel;
   (b) estimating a probability distribution of the normalised saturation values;
   (c) defining a transfer function for modifying the normalised saturation values, based on the estimated probability distribution;
   (d) limiting local gain of the transfer function to a predetermined value; and
   (e) applying the transfer function to the normalised saturation values to generate modified saturation values,
   wherein the colour image includes a plurality of luminance regions and method steps (a) to (e) are performed on the colour image irrespective of different luminance values in each of the plurality of luminance regions thereby computing only one histogram for the plurality of luminance regions.

2. The method of claim 1, wherein the mapping from colour saturation values to normalised saturation values is such that the range of values of normalised saturation is the same independent of the colour saturation value of each pixel.

3. The method of claim 1, wherein the step of estimating the probability distribution of the normalised saturation values comprises estimating the probability distribution of normalised saturation values for each of a plurality of hue intervals.

4. The method of claim 1, wherein the transfer function is defined so as to modify the estimated probability distribution of the normalised saturation values to better match a target distribution.

5. The method of claim 4, wherein the target distribution is one of:
   a uniform distribution; and
   a distribution derived from the estimated probability distribution.

6. The method of claim 4, wherein the target distribution derived from the estimated probability distribution is a smoothed version of the estimated distribution.

7. The method of claim 1, wherein a maximum slope of the transfer function is limited by a threshold.

8. The method of claim 7, wherein the threshold varies dependent on the normalised saturation value.

9. The method of claim 1, further comprising, before the step of applying the transfer function to the normalised saturation values, smoothing the transfer function.

10. The method of claim 1, further comprising applying a second transfer function to one of the normalised saturation values and the colour saturation values.

11. A non-transitory computer-readable storage medium, comprising computer program code which performs the steps of claim 1 when said program is run on a computer.

12. A colour-gamut extension method for enhancing a colour of a colour image comprising a plurality of pixels, the method comprising:
(a) mapping a colour saturation value of each pixel to a normalised saturation value, wherein a range of values of normalised saturation is the same independent of the luminance value of the each pixel, wherein the colour saturation value of the each pixel is represented relative to a maximum saturation value dependent on at least one of the luminance and the hue of the each pixel;
(b) estimating a probability distribution of the normalised saturation values;
(c) defining a transfer function for modifying the normalised saturation values, based on the estimated probability distribution;
(d) limiting local gain of the transfer function to a predetermined value; and
(e) applying the transfer function to the normalised saturation values to generate modified saturation values,
wherein the colour image includes a plurality of luminance regions and method steps (a) to (e) are performed on the colour image irrespective of different luminance values in each of the plurality of luminance regions thereby computing only one histogram for the plurality of luminance regions.

13. A colour image processing apparatus, for enhancing a colour of a colour image comprising a plurality of pixels, the apparatus comprising:
a first colour space conversion unit, adapted to map a colour saturation value of each pixel to a normalised saturation value, wherein a range of values of normalised saturation is the same independent of a luminance value of a pixel, wherein the colour saturation value of the each pixel is represented relative to a maximum saturation value dependent on at least one of the luminance and the hue of the each pixel;
a saturation modification unit, adapted to estimate a probability distribution of the normalised saturation values;
define a transfer function for modifying the normalised saturation values, based on the estimated probability distribution;
limit local gain of the transfer function to a predetermined value; and
apply the transfer function to the normalised saturation values; and
a second colour space conversion unit, adapted to inversely map the normalised saturation value of each pixel to generate an output colour saturation value,
wherein the colour image includes a plurality of luminance regions and the apparatus operates on the colour image irrespective of different luminance values in each of the plurality of luminance regions thereby computing only one histogram for the plurality of luminance regions.

* * * * *